UNITED STATES PATENT OFFICE.

GEORGE A. FREAR, OF CHICAGO, ILLINOIS, ASSIGNOR OF ONE-HALF INTEREST TO CHARLES HOLLAND, OF SAME PLACE.

IMPROVEMENT IN THE MANUFACTURE OF ARTIFICIAL MARBLE.

Specification forming part of Letters Patent No. 106,263, dated August 9, 1870; reissue No. 5,205, dated December 24, 1872.

*To all whom it may concern:*

Be it known that I, GEORGE A. FREAR, of Chicago, in the county of Cook and State of Illinois, have invented a new and useful Improvement in the Production of Artificial Marble, of which the following is a specification:

The nature of my invention consists in the use of a solution of sulphate of zinc, chloride of zinc, sugar of lead, alum, and common salt, or certain combinations of two or more of said ingredients, as hereinafter specified, in suitable proportions, dissolved in water for the purpose of cementing together particles of pulverized silex, alumina, marble cement, hydraulic cement, sulphate of lime, barytes, or other kindred mineral or earthy substances, (except carbonate of lime,) used singly or in combination, to produce a hard and durable artificial marble or imitation of marble, for useful and ornamental purposes.

The cementing solution is best obtained, as a general rule, by employing the following-named ingredients in about the following proportions, viz: Take from two to four ounces of sulphate of zinc, from two to four ounces of chloride of zinc, from two to four ounces of the sugar of lead, from two to four ounces of alum, and from two to four ounces of rock-salt, (chloride of sodium,) and dissolve the same in one gallon of hot or warm rain-water; but the proportions of the several ingredients may be varied, not only according to the strength and quality thereof, but also for the purpose of varying the character and quality of the marbles to be produced therewith. Other soft water may be used instead of rain-water when the latter cannot be procured in sufficient quantity.

To produce a firm and durable imitation marble, impervious to moisture, I dampen with this solution a mixture of about one part of marble cement or hydraulic cement, one part of ground silex, one part of sulphate of barytes, and one part of sulphate of lime, and form the same into a pasty mass of about the consistency of mortar, and run the same into molds. The composition will rapidly set and harden in the molds, and may soon be removed and laid out on boards exposed to the air to dry and harden. It is well to compress the composition into the molds either by tamping or by suitable machinery. By adding suitable coloring matter to the composition when it is in the plastic state, or to the solution with which it is moistened, as described, beautiful imitations of all varieties of marbles may be readily obtained.

The composition readily hardens when removed from the molds, and is soon ready for polishing. My artificial marble thus produced is ready for use in its rough state for tiling, for floors, &c.; but to produce a more finished article, I wash the face or surface thereof one or two days after it has been molded, as described, with my solution, repeating the washings two or three days in succession, and at the same time filling up any cavities or defects, if any exist, with some of the same mixture composing the stone, made thin enough to be applied with a brush, all excess of the material being scraped off before it hardens. The imitation marble thus treated may be polished after it has hardened for two or three days. To produce a fine polish and brilliant finish, I first rub the surface down, after it has thoroughly hardened, with a piece of pumice-stone sprinkled with water and ground pumice-stone, or with other suitable rubbing or grinding material; and, after cleaning the surface with care, let it stand in the sun or in a warm room two or three hours. I then rub it down with a smooth oilstone or hone, or other polishing substance, and let it stand two or three hours, as before. I next rub the smooth surface thus produced with a mixture of one part of olive-oil and two parts of gum shellac, and when dry coat it over with a thin coat of copal varnish, and place it in a hot kiln and subject it to the heat for ten or twelve hours. I next rub it down again, wipe it off carefully, and finally rub it up with putty-polish, or with white wax dissolved in benzine, (one-quarter of a pound of wax in one quart of benzine,) upon felt or woolen cloth, until a beautiful and brilliant gloss is obtained.

In addition to the mineral or earthy substances above enumerated to form the base of my artificial marble, I contemplate using suitable clays, manganese, spar, or any other suitable mineral or earthy substance, singly or any two or more in combination, the mass being treated as hereinbefore described. Whatever solid substances are used must be finely pulverized. Through a proper selection and choice of the material forming the solid basis of my artificial marble, and by the use of proper coloring matters in connection therewith, every description of natural marble may be imitated, and numerous varieties obtained at pleasure.

As I have before stated, the proportions of the different ingredients used may be varied somewhat, and the said ingredients, or a part of them, may be combined in various ways—for instance, in making tiles for floors which do not require a polish, alum and sugar of lead only may be used in the solution; again, when oxides are used as coloring matter, (as the oxide of iron and black oxide of manganese for producing an imitation of jasper,) it is not essential to use the chloride of zinc in the solution, as the sulphate, in combination with these oxides, and with rock-salt submitted to heat, will, by chemical action, produce chloride of zinc. In such case, however, the proportion of sulphate of zinc should be increased. These oxides act as very efficient drying and hardening agents. In making veined or highly colored marbles, the quantity of alum used in the solution should be somewhat reduced, as too much alum causes the salt to appear on the surface and blur the veining or coloring.

By the use of the materials and processes herein described I produce a new kind of stone, which I call "Manhattan Artificial Marble," although it differs from and is superior to other marbles in many particulars, among which the following may be enumerated: First, it will withstand the action of fire without being converted into lime; second, it can be made into any form while it is in process of manufacture, and thus articles for both useful and ornamental purposes may be made from it of great beauty and at much less expense than from other marbles; third, by the use of coloring matters in the process of manufacture all native marbles may be closely imitated, thus producing imitation marbles of great beauty at a greatly-reduced expense; fourth, my artificial marble withstands the action of acids and oils on its surface without impairing its beauty, and will not stain by the application of ink and the like; fifth, owing to its plasticity while in process of manufacture, a greater variety of articles, both useful and ornamental, can be made from my artificial marble than from native marbles, except at great expense; sixth, my artificial marble may be molded into slabs of any desired size at small expense, while native marbles can only be obtained in large slabs at great expense, and some of the more valuable varieties not at all.

I claim as my invention—

1. The solution herein described, consisting of the sulphate of zinc or chloride of zinc, or both, in combination with sugar of lead, alum, and common salt, or with either of said substances, when used in combination with any of the mineral or earthy substances herein enumerated or their equivalents, for the purpose of cementing their particles together and forming an artificial stone, substantially as described.

2. As a new article of manufacture, artificial marble composed of the materials herein described and produced, substantially as set forth in the foregoing claim.

3. The process of polishing and finishing off artificial marble, substantially as herein set forth.

GEO. A. FREAR.

Witnesses:
A. E. FREAR,
PATRICK RAFFERTY.